United States Patent [19]

Wuchter

[11] 3,965,070

[45] June 22, 1976

[54] CROSSLINKED VINYLCARBONYL RESINS HAVING α-AMINO ACID FUNCTIONALITY

[75] Inventor: Richard B. Wuchter, Rydal, Pa.

[73] Assignee: Rohm and Haas Company, Philadelphia, Pa.

[22] Filed: Oct. 7, 1974

[21] Appl. No.: 512,813

[52] U.S. Cl. .......................... 260/73 R; 260/2.2 C; 260/2.1 C; 260/7.2 R; 260/65; 260/67 UA; 260/29.6 H; 260/29.6 CM; 260/29.6 AT; 210/38 R
[51] Int. Cl.² ........................................ C08G 10/04
[58] Field of Search .............. 260/67 UA, 65, 72 R, 260/2.2 C, 2.1 C, 29.6 H, 29.6 CM, 29.6 AT, 73 R

[56] References Cited
UNITED STATES PATENTS

| | | | |
|---|---|---|---|
| 3,089,861 | 5/1963 | Leyerzapf | 260/67 UA |
| 3,177,171 | 4/1965 | Gruber et al. | 260/67 UA X |
| 3,234,164 | 2/1966 | Kern et al. | 260/67 UA X |
| 3,271,334 | 9/1966 | Kern et al. | 260/67 UA X |
| 3,770,700 | 11/1973 | Forgione | 260/67 UA X |
| 3,813,353 | 5/1974 | Clemens et al. | 260/67 UA X |

Primary Examiner—Lucille M. Phynes

[57] ABSTRACT

Amphoteric resins are prepared by the Strecker synthesis of crosslinked vinylcarbonyl polymers. The crosslinked vinylcarbonyl polymer such as, for example, polyacrolein is reacted with an amine component such as ammonia and an inorganic cyanide to obtain after hydrolysis resins having good weak base and weak acid exchange capacities. The amphoteric nature and higher capacities make them highly suitable for the removal of sulfur oxides from waste streams.

12 Claims, No Drawings

CROSSLINKED VINYLCARBONYL RESINS HAVING α-AMINO ACID FUNCTIONALITY

This invention relates to crosslinked vinylcarbonyl resins and to their preparation and use. More specifically the invention relates to the method of converting vinylcarbonyl copolymers such as acrolein to amphoteric resins containing α-amino acid functionality by reacting the copolymers according to the Strecker synthesis (Merck Index, Seventh Edition, page 1471). The amphoteric resins of the invention are preferably prepared by a two-step series of reactions involving copolymerizing the monomer mixture with one or more crosslinking agents to produce a crosslinked aldehyde- or ketone-containing resin. These resins are subsequently reacted according to the Strecker synthesis with an amine component and an inorganic ionic cyanide to produce on hydrolysis the vinyl α-amino acid resin.

The copolymerization step may be performed at temperatures ranging from about 0°C. to about 150°C. or higher by any of the well-known polymerizing techniques such as bulk or emulsion polymerization. In a preferred embodiment this step is carried out by copolymerization of the acrolein type monomer with the crosslinking agent or agents using the procedure of suspension polymerization. In this procedure the vinylcarbonyl monomer, the crosslinking agent and a free radical generating catalyst are mixed and suspended by agitation in an aqueous medium, preferably a brine or salt solution to repress the water solubility of the monomers. Organic solvents may also be used.

The polymerization may be effected to produce polymers which are macroreticular in nature or, if desired, to obtain polymers having a gellular structure.

A suspensing agent is usually used to assist in the formation of the suspension and to stabilize the formed suspension. Many water soluble polymeric materials may be used for this purpose and they may be either anionic, cationic or neutral. Examples are sodium polyacrylate, polyacrylamide and polyvinylimidazoline bisulfate. Alternatively, clays and other finely divided solids may be useful. Free radical generating catalysts may include organic peroxidic agents typified by peroxides, whether organic or inorganic, and the so-called "per" salts such as the water soluble perborates, persulfates and perchlorates. The catalysts are employed in suitable amounts ranging from about 0.1 to about 5%, based on the weight of the monomeric material to be polymerized. As mentioned hereinbefore, the starting monomers which form the backbone of the resin have been referred to as vinylcarbonyl, polyacrolein or even acrylic aldehydes. In the interest of avoiding ambiguities in nomenclature, these above terms refer to monomers having the following general structure:

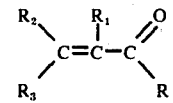

where
R = H, alkyl $C_1$–$C_4$
$R_1$ = H, alkyl $C_1$–$C_{10}$
$R_2$ = H, alkyl $C_1$–$C_{18}$, aryl, alkylaryl, cycloalkyl
$R_3$ = H, alkyl $C_1$–$C_{18}$, aryl, alkylaryl, cycloalkyl Preferred monomers however are acrolein and methacrolein. The crosslinking agents essential to the copolymerization reaction may be any agent or mixture of agents generally employed in styrene, acrylate and methacrylate systems. Preferred crosslinking monomers include polyvinyl aromatic hydrocarbons, such as divinylbenzene and trivinylbenzene and polyvinyl ethers and esters of polyhydric alcohols such as ethylene glycol, divinyl ether, glycerol trivinyl ether, diethyleneglycol divinyl ether and trimethylolpropane trimethacrylate. The amount of crosslinking monomer may range from about 2 to 30% although preferred embodiments would utilize a crosslinking range of about 3 to 10%. Such percentages are calculated on a weight basis level.

The second step of the two-step series rection involves the conversion of the polymer to the functional resin. As mentioned hereinbefore, it has been discovered that the Strecker synthesis is ideally suitable for this purpose. This synthesis further explained in literature reference Chemical Review, 1948, pages 231 through 240, includes the reaction of an acrolein compound with an amine component and an inorganic ionic cyanide. For ease of handling the salts of such components are used. The amine component may include ammonia, methylamine or dimethylamine. A preferred reaction would proceed along the hereinbelow indicated structure:

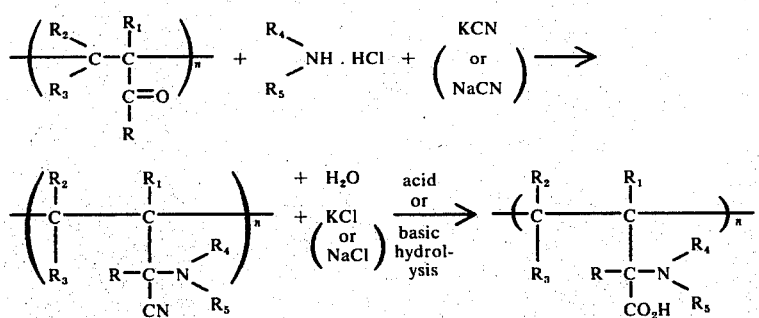

where R, $R_1$, $R_2$ and $R_3$ are as indicated hereinbefore and $R_4$ and $R_5$ may be H, $C_1$–$C_{18}$ alkyl, or arylalkyl and may be the same or different or may be linked to form a cyclic compound.

Preferred α-amino acid funtionalities are α-alkyl glycine and N-methyl-α-alkyl glycine.

The amphoteric resins of the invention are useful in all the well-known applications of amphoteric resins. For example, they find utility in the removal of transition metals from streams. Particular usefulness has been discovered in the removal of sulfur oxides from waste streams. The resins are suitable for this particular application due to their high capacity for sulfur compounds and great resistance to organic fouling. Frequently amphoteric resins are thermally regenerable and for this reason provide substantial cost savings to the industry in that expensive chemical regenerants are no longer required.

In the examples and throughout the specification and claims, all numbers and percentages are by weight unless otherwise stated.

EXAMPLE I

Sodium chloride (116 g), 4 drops concentrated sulfuric acid and 150 g of water are added to a 1-liter flask containing an efficient two-tiered stirrer, condenser, and nitrogen inlet tube. Polyacrylic acid dispersant, such as 5 gm of Primafloc C-7 available from Rohm and Haas Company, is then added to a solution containing a 0.1 g tannic acid dissolved in 136 g of water. This solution is then added to the stirred flask containing sodium chloride. This aqueous phase is then sparged with nitrogen. In a separate flask, 314 mls. of acrolein is sparged for 20 – 30 minutes with nitrogen. In a separate flask a solution of 29.6 g of divinylbenzene (DVB-81.1% active), 6.0 g of diethyleneglycoldivinylether (DEGDVE), and 9.0 g of Percadox 16 (bis-t-butylcyclohexyl percarbonate) is prepared. This latter solution is then added to acrolein, shaken until homogeneous, and added to the aqueous phase in the reaction flask after the stirrer had been turned off and the nitrogen sparge had been converted to a nitrogen atmosphere. A suspension formed in 20 – 30 minutes on intermittent agitation at 145 rpm. The position of the stirrer blade must be at the interfaces of the two liquid phases. After the dispersion is formed, the reaction mixture is heated to 50°C. and held there with intermittent heating and air cooling for 16 hours. The reaction contents are then cooled to room temperature, the liquid drained, and the resin given three water washes. After washing with methanol, the resin is dried at 75°C. for 16 hours.

The crosslinked polyacrolein copolymer above (56 g), 74.2 g of methylamine hydrochloride, 53.9 g sodium cyanide, 400 ml water, and 400 ml methanol are charged to a two-liter three-necked flask fitted with an air stirrer, thermometer, reflux condenser and heating mantle. The reaction mixture is then heated to 60°C and held there for 16 hours. After cooling, the supernatant liquor is drained off and washed three times with 200 ml. of water and three times with 200 ml of 6N hydrochloric acid. The third hydrochloric acid wash is retained in the flask, and the contents are heated to reflux and held there for 16 hours. After cooling to 25°C and washing with water until a neutral pH is achieved, a 1 N ammonium hydroxide solution is then added until a slightly alkaline solution results. A dried sample of this N-methyl-$\alpha$-alkylglycine resin exhibited 24.6% solids and a cation exchange capacity of 3.95 meg/g.

EXAMPLE II

Sodium chloride (130 g.), 2 – 3 drops concentrated sulfuric acid, 0.1 g. tannic acid, and 200 g of water are added to a 1-liter flask equipped with a 4-paddle stainless steel stirrer, condenser, and nitrogen inlet tube. Polyacrylic acid dispersant (4 g) is dissolved in 120 g of water and added to the reaction flask. The aqueous phase is then sparged with nitrogen. In a separate flask, a solution of distilled acrolein (171 g), DVB (24.1 g of 80% active material), 105 g toluene, and 2.92 g Percadox 16 is prepared. This organic solution is then added to the aqueous phase with the stirrer turned off. A dispersion is formed on intermittent agitation. The stirrer speed is then adjusted to 172 rpm, nitrogen sparge converted to a nitrogen atmosphere, and the temperature is increased to 50°C. After the reaction is held at 50°C for 16 hours, the contents are cooled to room temperature, liquid drained, and contents given three water washes. Toluene is then azeotropically distilled off. The contents are then cooled to room temperature, washed twice with water followed by a methanol wash before drying at 75°C for 16 hours. There is recovered 144 g of crosslinked polyacrolein resin.

To a 3-necked 1-liter flask equipped with a stirrer, reflux condenser, thermometer, and heating mantle is added 60 g of crosslinked polyacrolein resin and 200 ml of methanol. In a separate flask a solution containing 55 g sodium cyanide, 59 g ammonium chloride, and 200 ml water is prepared. This aqueous solution is then added to the reaction flask with stirring. The reaction exotherms to about 40°C. External heating is applied to maintain a temperature of 45°C for 16 hours. The reaction contents are then cooled to 25°C and washed four times with water followed by three washes with 6N hydrochloric acid. About 700 ml of the last hydrochloric acid wash is left in the flask, and the contents are then refluxed for 16 hours. After cooling to 25°C and washing with water until a neutral pH is achieved, a 1 N ammonium hydroxide solution is then added until a slightly alkaline solution results. A dried sample of this $\alpha$-alkylglycine resin gives the following elemental analysis:

% nitrogen = 8.44
% oxygen = 23.24
% carbon = 53.88
% hydrogen = 7.83

EXAMPLE III

Sodium chloride (116 g), 2 – 3 drops concentrated sulfuric acid, and 150 g water are added to a 1-liter flask equipped with a 4-paddle stainless steel stirrer, condenser, and nitrogen inlet tube. The polyacrylic acid dispersant solution (5 g) is added to a solution of tannic acid in 136 g of water and then added to the stirred flask containing sodium chloride. The 1-liter reaction flask is then sparged with nitrogen. In a separate flask 280 ml of acrolein, 58.5 g of DVB (51.3% active), 6 g of DEGDVE, and 9 g of Percadox 16 are dissolved and sparged with nitrogen for 20 – 30 minutes. This organic solution is then added to the aqueous phase in the reaction flask with the stirrer turned off. The nitrogen sparge is converted to a nitrogen atmosphere. A dispersion is formed on intermittent agitation. The agitator speed is adjusted to 151 rpm. After the dispersion is formed, the reaction is heated to 50° C. and held there for 16 hours. The reaction contents are cooled to room temperature, liquid drained, and the resin is given three water washes. There is obtained 298 gm of a gellular resin after drying at 75° C. for 16 hours.

This crosslinked polyacrolein copolymer is converted to an $\alpha$-aminoacid derivative using the standard methods described in Examples I and II above.

We claim:

1. A resin having α amino acid functionality and which is derived from a crosslinked vinylcarbonyl copolymeric backbone, said resin having the followng general formula:

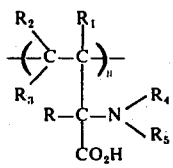

wherein R is H or $C_1 - C_4$ alkyl; $R_1$ is H or $C_1 - C_{10}$ alkyl; $R_2$ and $R_3$ are independently selected from H, $C_1$–$C_{18}$ alkyl, aryl, alkylaryl, and cycloalkyl; and $R_4$ and $R_5$ are independently selected from H, $C_1 - C_{18}$ alkyl, and arylalkyl or taken together are linked to form a cyclic ring, said resin being crosslinked with about 2 to 30% by weight of at least one crosslinking monomer selected from polyvinyl aromatic hydrocarbons and polyvinyl ethers and esters of polyhydric alcohols.

2. A resin as claimed in claim 1 wherein the vinylcarbonyl copolymeric backbone is acrolein.

3. A resin as claimed in claim 1 wherein the functional moiety is α-alkylglycine.

4. A resin as claimed in claim 1 wherein functional moiety is N-methyl-α-alkylglycine.

5. A resin as claimed in claim 1 wherein the crosslinker is divinylbenzene.

6. A resin as claimed in claim 1 wherein the crosslinker is a mixture of divinylbenzene and diethyleneglycol divinyl ether.

7. A resin as claimed in claim 1 which is macroreticular in structure.

8. A resin as claimed in claim 1 wherein the resin is gellular in structure.

9. A process for preparing an amphoteric ion exchange resin having α amino acid functionality which comprises the steps of copolymerizing by suspension polymerization a vinylcarbonyl monomer of the general formula:

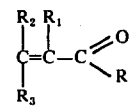

wherein R is H or $C_1 - C_4$ alkyl; $R_1$ is H or $C_1 - C_{10}$ alkyl; and $R_2$ and $R_3$ are independently selected from H, $C_1 - C_{18}$ alkyl, aryl, alkylaryl and cycloalkyl, in the presence of at least one crosslinking monomer selected from polyvinyl aromatic hydrocarbons and polyvinyl ether and esters of polyhydric alcohols, thereafter reacting the copolymer by the Strecker synthesis with an inorganic ionic cyanide component and with an amine of the formula $(R_4)(R_5)NH$ wherein $R_4$ and $R_5$ are independently selected from H, $C_1 - C_{18}$ alkyl and arylalkyl and taken together $R_4$ and $R_5$ may define a cyclic radical, and finally hydrolizing the reaction product to obtain an α-amino acid resin.

10. A process as claimed in claim 9 wherein the amine component comprises ammonium chloride.

11. A process as claimed in claim 9 wherein the the cyanide component comprises potassium or sodium cyanide.

12. A process as claimed in claim 9 wherein the copolymeric backbone comprises acrolein.

* * * * *